United States Patent
Zheng et al.

(10) Patent No.: US 9,842,709 B2
(45) Date of Patent: Dec. 12, 2017

(54) ELECTRONIC TRIP UNITS POWERED BY CURRENT TRANSFORMERS AND CIRCUIT BREAKERS COMPRISING THE SAME

(71) Applicant: Eaton Corporation, Cleveland, OH (US)

(72) Inventors: Gerald Zheng, Guangdong (CN); Xin Zhou, Wexford, PA (US); James Leo Lagree, Robinson Township, PA (US); Theodore James Miller, Oakdale, PA (US); Bruce Wu, Guangdong (CN); Sui Ouyang, Guangdong (CN)

(73) Assignee: Eaton Corporation, Cleveland, OH (US)

( * ) Notice: Subject to any disclaimer, the term of this patent is extended or adjusted under 35 U.S.C. 154(b) by 245 days.

(21) Appl. No.: 14/663,890

(22) Filed: Mar. 20, 2015

(65) Prior Publication Data
US 2016/0276115 A1 Sep. 22, 2016

(51) Int. Cl.
*H01H 9/54* (2006.01)
*H01H 37/32* (2006.01)
(Continued)

(52) U.S. Cl.
CPC .............. *H01H 9/54* (2013.01); *H01H 37/32* (2013.01); *H01H 71/123* (2013.01);
(Continued)

(58) Field of Classification Search
CPC ........ H01H 9/54; H01H 37/32; H01H 71/123; H01H 71/125; H01H 83/20;
(Continued)

(56) References Cited

U.S. PATENT DOCUMENTS

| | | | |
|---|---|---|---|
| 3,700,967 A | 10/1972 | Hoss | |
| 5,457,591 A * | 10/1995 | Mock | H02H 3/08 361/18 |

(Continued)

FOREIGN PATENT DOCUMENTS

EP    1 359 655 A2    11/2003

OTHER PUBLICATIONS

International Search Report and Written Opinion Corresponding to International Application No. PCT/US2016/022749; dated Jun. 13, 2016; 14 Pages.

*Primary Examiner* — Thienvu Tran
*Assistant Examiner* — Kevin J Comber
(74) *Attorney, Agent, or Firm* — Myers Bigel, P.A.

(57) ABSTRACT

A circuit breaker includes a set of separable contacts moveable between a closed position and an open position, an operating mechanism configured to open the set of contacts, a conductor coupled to the set of contacts, a current transformer coupled to the conductor, and a trip circuit coupled to the operating mechanism and to the current transformer and configured to cause the operating mechanism to open the set of contacts when a current through the conductor exceeds a current threshold that is greater than a saturation threshold of the current transformer. The trip circuit is further configured to vary the current threshold during an interval following a closure of the set of the contacts and to provide a fixed current threshold thereafter.

22 Claims, 9 Drawing Sheets

(51) Int. Cl.
*H01H 71/12* (2006.01)
*H01H 83/20* (2006.01)
*H02H 3/08* (2006.01)
*H02H 5/04* (2006.01)
*H02H 1/00* (2006.01)
*H02H 1/04* (2006.01)
*H01H 11/00* (2006.01)

(52) U.S. Cl.
CPC .......... *H01H 71/125* (2013.01); *H01H 83/20* (2013.01); *H02H 3/08* (2013.01); *H02H 5/044* (2013.01); *H01H 2011/0068* (2013.01); *H02H 1/0007* (2013.01); *H02H 1/046* (2013.01)

(58) Field of Classification Search
CPC ......... H01H 2011/0068; H02H 1/0007; H02H 1/046; H02H 3/08; H02H 5/044
USPC ....................................................... 361/93.6
See application file for complete search history.

(56) References Cited

U.S. PATENT DOCUMENTS

| | | | |
|---|---|---|---|
| 2003/0202305 A1* | 10/2003 | Engel | .................. H02H 3/085 361/93.8 |
| 2008/0012666 A1* | 1/2008 | Davison | ................ H02H 1/046 335/18 |
| 2008/0215278 A1 | 9/2008 | Colsch et al. | |
| 2014/0077782 A1* | 3/2014 | Cortigiani | .......... H03K 17/0822 323/284 |
| 2014/0078633 A1 | 3/2014 | Zhou | |

* cited by examiner

ELECTRONIC TRIP UNITS POWERED BY CURRENT TRANSFORMERS AND CIRCUIT BREAKERS COMPRISING THE SAME

BACKGROUND

The present inventive subject matter relates generally to circuit breakers and methods of operating the same and, more particularly, to circuit breakers including current transformers and electronic trip units.

Circuit breakers are commonly used to protect circuitry, such as distribution wiring, from overheating due to short circuits or overloads. Circuit breakers typically include at least one set of contacts that is configured to be opened and closed by an actuator mechanism. The actuator mechanism is typically configured open and close the contacts in response to a manual or other mechanical input (e.g., by movement of a motorized actuator), and is further configured to rapidly open in response to an input from a trip unit.

Circuit breaker trip units may operate in a number of ways. For example, trip units for thermal magnetic breakers typically trip breaker contacts in response to current in and temperature of conductors in the breaker. Such trip units may use current transformers to sense currents for so-called "instantaneous" current-level tripping, and may use mechanical and/or electromechanical devices to provide thermal tripping.

SUMMARY

According to example embodiments of the present inventive subject matter, a circuit breaker may include a set of separable contacts moveable between a closed position and an open position, an operating mechanism configured to open the set of contacts, a conductor coupled to the set of contacts, a current transformer coupled to the conductor, and a trip circuit coupled to the operating mechanism and to the current transformer. The trip circuit may be configured to cause the operating mechanism to open the set of contacts when a current level through the conductor exceeds a current threshold that is greater than a saturation threshold of the current transformer.

In example embodiments of the present inventive subject matter, the circuit breaker may include a power supply circuit coupled to the current transformer. The power supply circuit may be configured to supply power to the trip circuit from the current transformer.

In example embodiments of the present inventive subject matter, the trip circuit may be configured to vary a level of the current threshold based on a state of the set of contacts.

In example embodiments of the present inventive subject matter, the trip circuit may be configured to vary the current threshold during an interval following a closure of the set of contacts and to provide a fixed current threshold thereafter.

In example embodiments of the present inventive subject matter, the trip circuit may include a current detection circuit coupled to the current transformer, a reference signal generator circuit, and a trip signal generator circuit. The current detection circuit may be configured to generate a current detection signal responsive to the current transformer. The reference signal generator circuit may be configured to generate a reference signal that varies during the interval following the closure of the set of contacts. The trip signal generator circuit may be configured to generate a trip signal responsive to a comparison of the current detection signal to the reference signal.

In example embodiments of the present inventive subject matter, the reference signal generator circuit may include a voltage regulator, a first resistor and a first capacitor connected in parallel, and a second resistor and a second capacitor connected in parallel. The voltage regulator may have an input voltage coupled to an output of the current transformer and an output voltage coupled to a first node. The first resistor and the first capacitor may be coupled to the first node and to a second node. The second resistor and the second capacitor may be coupled to the second node and to ground.

In example embodiments of the present inventive subject matter, the trip signal generator circuit may include a first variable resistor coupled to the current detection signal, and an instantaneous trip comparator with a first input coupled to the second node and a second input coupled to the first variable resistor. The trip signal may be an output of the instantaneous trip comparator.

In example embodiments of the present inventive subject matter, the circuit breaker may include a thermal sensor thermally coupled to the conductor. The thermal sensor may be configured to generate a temperature signal. The trip circuit may be further configured to open the set of contacts responsive to the temperature signal.

In example embodiments of the present inventive subject matter, the thermal sensor may include a thermal diode. The trip circuit may be further configured to open the set of contacts responsive to a voltage across the thermal diode.

In example embodiments of the present inventive subject matter, the thermal sensor may include a first thermal sensor that generates a first temperature signal. The circuit breaker may also include a second thermal sensor. The second thermal sensor may be configured to generate a second temperature signal indicating an ambient temperature of the circuit breaker. The trip circuit may be further configured to open the set of contacts responsive to the first and second temperature signals.

In example embodiments of the present inventive subject matter, the trip circuit may be configured to open the set of contacts responsive to a comparison of the first temperature signal to a reference temperature signal. The trip circuit may be configured to vary the reference temperature signal responsive to the second temperature signal.

In example embodiments of the present inventive subject matter, the trip circuit may further include a peak detection circuit. The peak detection circuit may be configured to detect a peak value of an output current from the current transformer which exceeds a reference peak value. The reference peak value may correspond to the current level through the set of contacts at which the trip circuit is configured to cause the operating mechanism to open the set of contacts.

In example embodiments of the present inventive subject matter, the reference peak value may be configured to rise from an initial reference peak value to a steady-state reference peak value when power is applied to the circuit breaker.

In example embodiments of the present inventive subject matter, the rise of the reference peak value from the initial reference peak value to the steady-state reference peak value may be responsive to a charging of a capacitor by an output of the current transformer.

In example embodiments of the present inventive subject matter, the steady-state reference peak value may be configured to be dynamically adjustable by altering a variable resistor element within the trip circuit.

According to example embodiments of the present inventive subject matter, a circuit breaker may include a set of separable contacts moveable between a closed position and an open position, an operating mechanism configured to open the set of contacts, a conductor coupled to the set of contacts, a thermal diode thermally coupled to the conductor, and a trip circuit coupled to the operating mechanism and to the thermal diode. The trip circuit may be configured to cause the operating mechanism to open the set of contacts responsive to the thermal diode.

In example embodiments of the present inventive subject matter, the circuit breaker may include an ambient thermal sensor. The ambient thermal sensor may be configured to measure an ambient temperature of the circuit breaker. The trip circuit may be configured to cause the operating mechanism to open the set of contacts responsive to the thermal diode and the ambient thermal sensor.

In example embodiments of the present inventive subject matter, the trip circuit may be configured to open the set of contacts responsive to a comparison of a temperature signal from the thermal diode to a reference temperature signal. The trip circuit may be configured to vary the reference temperature signal responsive to an ambient temperature signal from the ambient thermal sensor.

In example embodiments of the present inventive subject matter, the reference temperature signal can be configured to be dynamically adjusted by altering a variable resistor element within the trip circuit.

In example embodiments of the present inventive subject matter, the trip circuit may be a first trip circuit. The first trip circuit may include a current transformer coupled to the conductor, and a second trip circuit coupled to the current transformer and the operating mechanism. The second trip circuit may be configured to cause the operating mechanism to open the set of contacts responsive to a current level through the set of contacts that is greater than a saturation level of the current transformer.

In example embodiments of the present inventive subject matter, the first trip circuit and the second trip circuit may be powered by the output of the current transformer.

According to example embodiments of the present inventive subject matter, a circuit breaker may include a set of separable contacts moveable between a closed position and an open position, an operating mechanism configured to open the set of contacts, a conductor coupled to the set of contacts, a first thermal sensor thermally coupled to the conductor, a second thermal sensor, and a trip circuit coupled to the operating mechanism and to the first and second thermal sensors. The first thermal sensor may be configured to generate a first temperature signal indicating a temperature of the conductor. The second thermal sensor may be configured to generate a second temperature signal indicating an ambient temperature of the circuit breaker. The trip circuit may be configured to cause the operating mechanism to open the set of contacts responsive to the first and second temperature signals.

In example embodiments of the present inventive subject matter, the trip circuit may be configured to open the set of contacts responsive to a comparison of the first temperature signal to a reference temperature signal. The trip circuit may be configured to vary the reference temperature signal responsive to the second temperature signal.

In example embodiments of the present inventive subject matter, the reference temperature signal may be configured to be dynamically adjusted by altering a variable resistor element within the trip circuit.

In example embodiments of the present inventive subject matter, the trip circuit may be a first trip circuit. The first trip circuit may further include a current transformer coupled to the conductor, and a second trip circuit coupled to the current transformer and the operating mechanism. The second trip circuit may be configured to cause the operating mechanism to open the set of contacts responsive to a current level through the set of contacts that is greater than a saturation level of the current transformer.

In example embodiments of the present inventive subject matter, the circuit breaker may further include an ambient temperature circuit, a transistor, and a trip comparator. The ambient temperature circuit may include a controllable voltage source integrated circuit with a first input coupled to a reference voltage, a second input coupled to ground and a first output coupled to an output node of the ambient temperature circuit, a variable resistor coupled to the reference voltage and to the output node of the ambient temperature circuit, and an ambient thermal diode coupled to the output node of the ambient temperature circuit and to ground. The transistor may have a drain coupled to the reference voltage, a source coupled to ground and a gate coupled to a voltage across a thermal diode. The trip comparator may have a first input coupled to the output node of the ambient temperature circuit and a second input coupled to the drain of the transistor. An output of the trip comparator may be configured to cause the operating mechanism to open the set of contacts.

BRIEF DESCRIPTION OF THE DRAWINGS

The above and other features and advantages of the present inventive subject matter will become more apparent by describing in detail embodiments thereof with reference to the attached drawings in which.

DETAILED DESCRIPTION OF THE EMBODIMENTS

Advantages and features of the present inventive subject matter and methods of accomplishing the same may be understood more readily by reference to the following detailed description of preferred embodiments and the accompanying drawings. The present inventive subject matter may, however, be embodied in many different forms and should not be construed as being limited to the embodiments set forth herein. Rather, these embodiments are provided so that this disclosure will be thorough and complete and will fully convey the concept of the present inventive subject matter to those skilled in the art, and the present inventive subject matter will only be defined by the appended claims. Like reference numerals refer to like elements throughout the specification.

The terminology used herein is for the purpose of describing particular embodiments only and is not intended to be limiting of the present inventive subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive subject matter.

Unless otherwise defined, all terms (including technical and scientific terms) used herein have the same meaning as commonly understood by one of ordinary skill in the art to which the present inventive subject matter belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Figure 1:
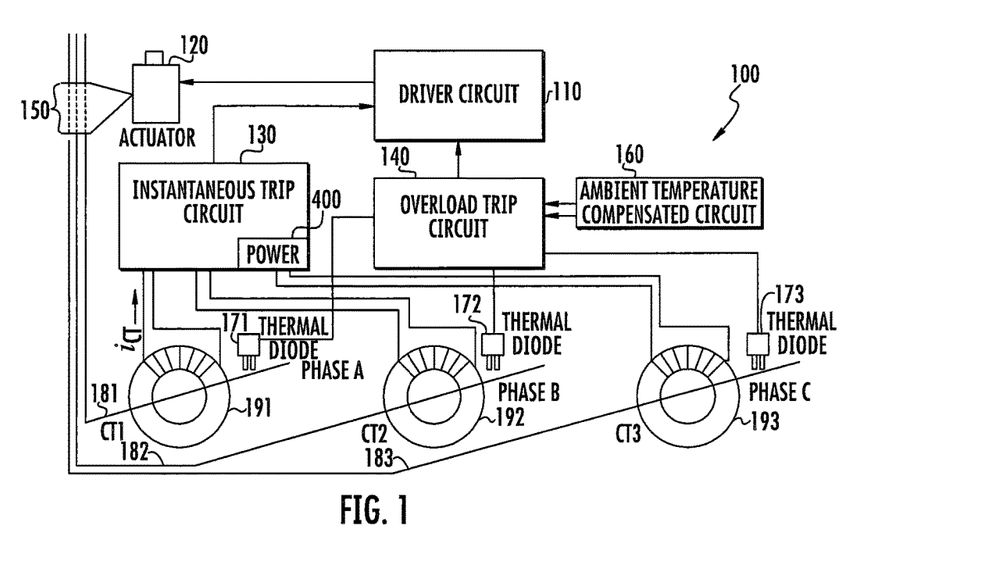
FIG. 1 is a block diagram of a circuit breaker according to some embodiments of the present inventive subject matter.

FIG. 1 is a block diagram of a circuit breaker according to some embodiments of the present inventive subject matter. The circuit breaker 100 may be configured to open a set of contacts 150 to interrupt current flow through a set of conductors 181, 182, 183 in response to certain predetermined conditions. The contacts 150 may be opened by an actuator 120. In some embodiments of the present inventive subject matter, the conductors 181, 182, 183 may represent phases of a multi-phase circuit.

The actuator 120 may be controlled by a driver circuit 110 which is configured to trip the actuator 120 to open the sets of contacts 150 in response to certain conditions, such as a short circuit or overload condition. The driver circuit 110 may control the actuator 120 in response to inputs provided by an instantaneous trip circuit 130 and an overload trip circuit 140. The instantaneous trip circuit 130 and the overload trip circuit 140 are two examples of inputs in to the driver circuit 110. The driver circuit 110 may also control the actuator 120 in response to other inputs.

The instantaneous trip circuit 130 may be configured to trip the circuit breaker 100 when an instantaneous value of the current flowing through a conductor exceeds a predetermined value. This may indicate that a short circuit has occurred. The instantaneous trip circuit 130 may be connected to current transformers 191, 192, 193 which may be operatively coupled to at least one conductor. For example, the current transformers 191, 192, 193 may be operatively coupled to three conductors 181, 182, 183, as shown in FIG. 1, where each conductor can represent one phase of a three-phase power circuit. The conductors 181, 182, 183 may be coupled, for example, to connectors or terminal blocks that are configured to be connected to external wires or cables protected by the circuit breaker 100. The current transformers 191, 192, 193 may be configured to generate an induced current $i_{CT}$ in response to the current flowing through the conductors 181, 182, 183. The induced current $i_{CT}$ may be proportional to the current flowing through the conductors 181, 182, 183. For example, a higher magnitude of alternating current flowing through the conductors 181, 182, 183 can result in a higher induced alternating current $i_{CT}$ being generated by the current transformers 191, 192, 193. A lower magnitude of alternating current flowing through the conductors 181, 182, 183 can result in a lower induced alternating current $i_{CT}$ being generated by the current transformers 191, 192, 193.

The induced current $i_{CT}$ from the current transformers 191, 192, 193 may be sensed by the instantaneous trip circuit 130. The instantaneous trip circuit 130 can be configured to monitor the induced current $i_{CT}$ to determine if the current flowing through the conductors 181, 182, 183 has exceeded a predetermined limit. If the instantaneous trip circuit 130 determines that the current flowing through the conductors 181, 182, 183 exceeds the predetermined limit, the instantaneous trip circuit 130 can provide an input to the driver circuit 110, which can cause the actuator 120 to open the contacts 150.

The current transformers 191, 192, 193 may also be used to power the circuit breaker 100. In particular, the current transformers 191, 192, 193 can provide power to the other elements of the circuit breaker 100 to facilitate the operation thereof.

The overload trip circuit may be configured to trip the circuit breaker 100 when a cumulative value of the current flowing through a conductor exceeds a predetermined level. This can indicate that a cumulative load on the circuit breaker 100 exceeds the rating of the circuit breaker 100, such as when the circuit is overloaded.

The overload trip circuit 140 may receive input from thermal diodes 171, 172, 173. The thermal diodes 171, 172, 173 may be placed internal to, or external to, the circuit breaker 100. While FIG. 1 shows three thermal diodes, the overload trip circuit 140 may accept input from more than three or fewer than three temperature sensors. The thermal diodes 171, 172, 173 may be configured so that there is one thermal diode for conductor, i.e., there may be a thermal diode associated with each phase, such that thermal diode 171 corresponds to conductor 181, thermal diode 172 corresponds to conductor 182, and thermal diode 173 corresponds to conductor 183. The thermal diodes 171, 172, 173 may be placed at any of a variety of different positions on the conductors 181, 182, 183. In some embodiments, multiple thermal diodes may be thermally coupled to each of the conductors 181, 182, 183. The thermal diodes 171, 172, 173 may also be placed so that some conductors 181, 182, 183 have a thermal diode placed on them while other conductors do not.

The overload trip circuit 140 can use the input from the thermal diodes 171, 172, 173 to determine if the load served by the conductors 181, 182, 183 has exceeded a predetermined limit. If the overload trip circuit 140 determines that the load exceeds the predetermined limit, the overload trip circuit 140 can provide input to the driver circuit 110. The driver circuit 110 may then engage the actuator 120 to open the contacts 150.

The overload trip circuit 140 may also receive input from an ambient temperature compensation circuit 160. The ambient temperature compensation circuit can provide an estimate of an ambient temperature of the circuit breaker 100. The overload trip circuit 140 can use the input of the ambient temperature compensation circuit 160 to adjust the predetermined limit at which the overload trip circuit 140 trips.

Based on the input of the ambient temperature compensation circuit 160, the overload trip circuit 140 may alter the predetermined limit at which the circuit breaker 100 is tripped. For instance, if the ambient temperature compensation circuit 160 provides input corresponding to a higher ambient temperature, the overload trip circuit 140 may increase the conductor temperature (as sensed by the thermal diodes 171, 172, 173) at which the circuit breaker 100 will be tripped. In other embodiments, in response to a higher temperature reported by the ambient temperature compensation circuit 160, the overload trip circuit 140 may decrease the conductor temperature at which the circuit breaker 100 will be tripped.

The ambient temperature compensation circuit 160 may use thermal sensors such as those employed by the overload trip circuit 140 to determine the ambient temperature. In some embodiments, the ambient temperature compensation circuit 160 may use thermal sensors different than those employed by the overload trip circuit 140.

Figure 2:
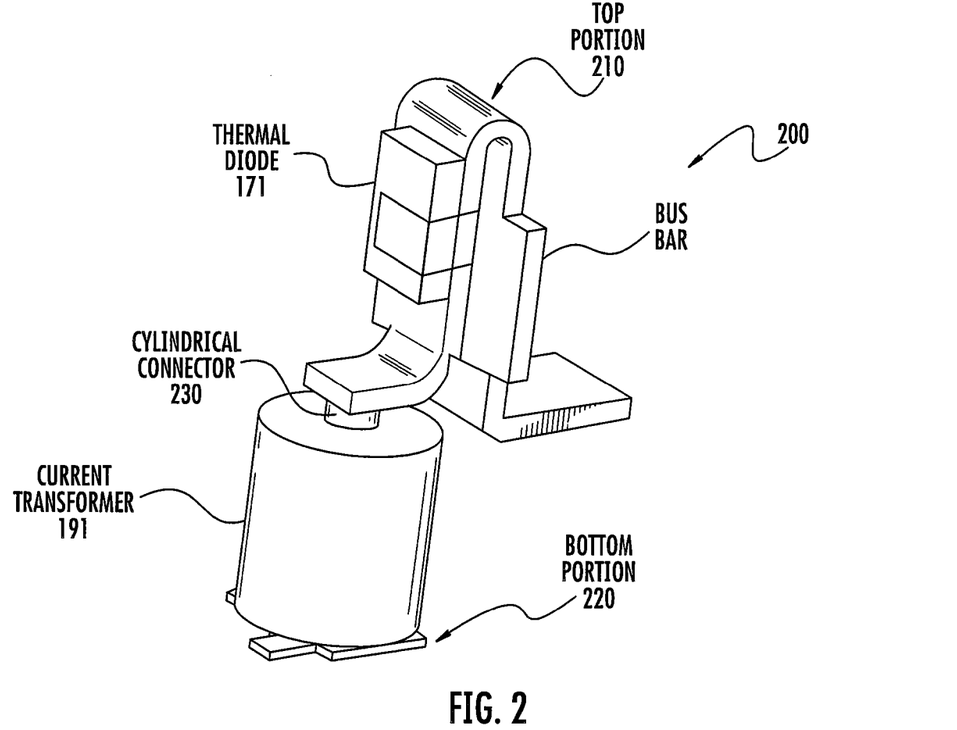
FIG. 2 illustrates a three dimensional view of a bus bar according to some embodiments of the present inventive subject matter.

FIG. 2 illustrates a three dimensional view of a bus bar that may be used for the conductors 181, 182, 183 according to some embodiments of the present inventive subject matter. The bus bar 200 may comprise a top portion 210 and a bottom portion 220. The thermal diode 171 may be attached to the top portion 210. The top portion 210 may be connected to the bottom portion 220 through a cylindrical connector 230. The cylindrical connector 230 may pass through a current transformer 191 such that the current transformer 191 encloses the cylindrical connector 230.

Figure 3:
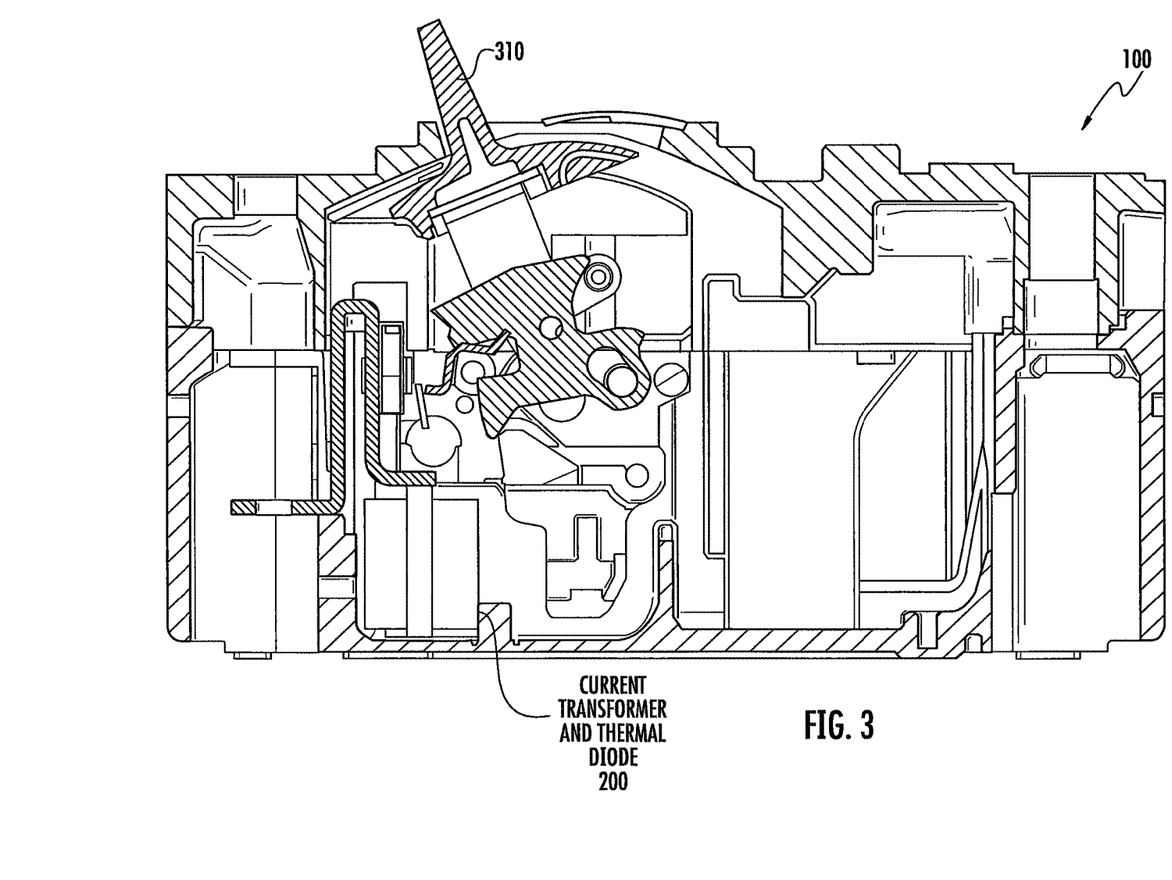
FIG. 3 illustrates a circuit breaker according to further embodiments of the present inventive subject matter.

Current flowing through the bus bar 200 may flow through the top portion 210, the cylindrical connector 230 and the bottom portion 220. Multiple bus bars 200 may be utilized by the circuit breaker 100. For example, the circuit breaker 100 may comprise three bus bars 200, one for each phase of a three-phase power system. The example embodiment illustrated in FIG. 2 is an example bus bar of the present inventive subject matter only and the present inventive subject matter is not limited thereto. A person of skill in the art will recognize that there are multiple configurations of bus bars using thermal diodes and current transformers which can embody the present inventive subject matter FIG. 3 illustrates a circuit breaker according to further embodiments of the present inventive subject matter. The circuit breaker 100 may include bus bars 200 such as those illustrated in FIG. 2. The circuit breaker 100 may also include a switch handle 310. The switch handle 310 position can correspond to the position of the contacts 150 illustrated in FIG. 1. When the contacts 150 are closed, the switch handle 310 may be closed and when the contacts 150 are open, the switch handle 310 may be open. The switch handle 310 may be manually moved to the open or closed position. Additionally, the switch handle 310 may be automatically moved to the open position by the circuit breaker 100 when the circuit breaker 100 is tripped.

Figure 4:
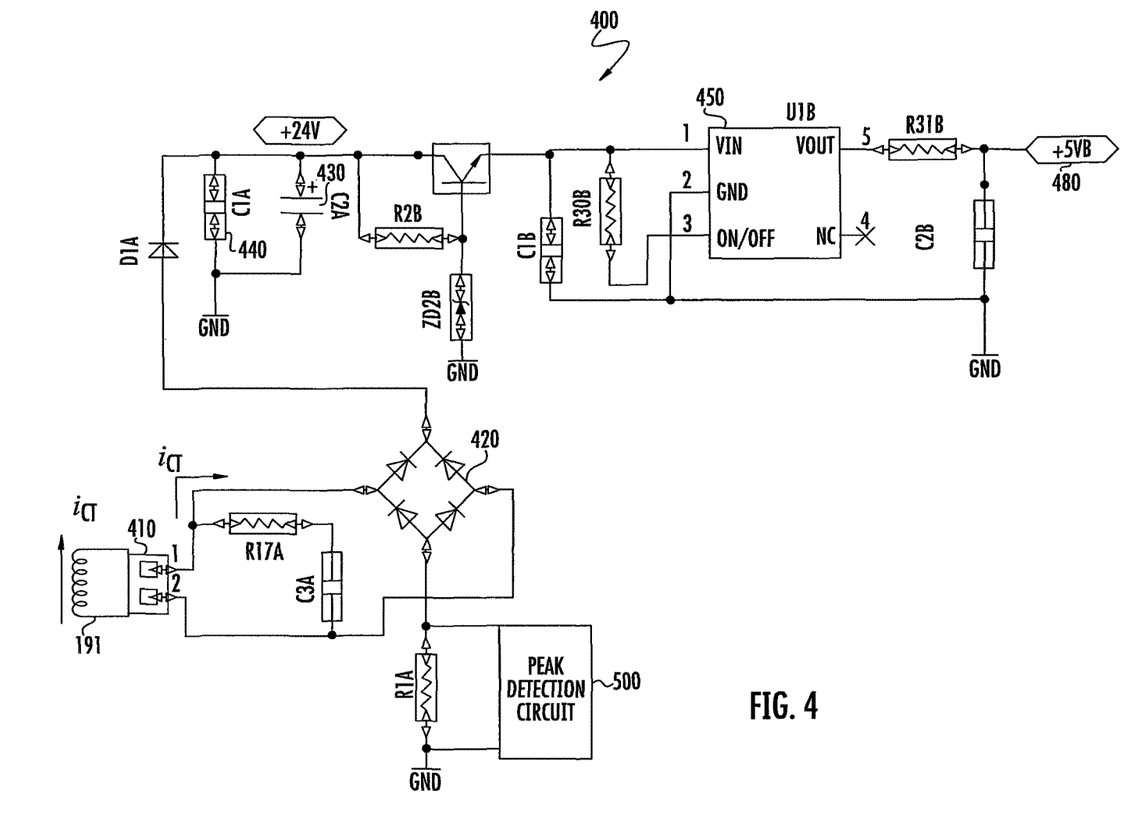
FIG. 4 illustrates a circuit to provide power to circuit breakers according to some embodiments of the present inventive subject matter.

FIG. 4 illustrates a circuit to provide power to circuit breakers according to some embodiments of the present inventive subject matter.

As shown FIG. 4, the current transformer 191 can be coupled to a power supply generating circuit 400 that receives an induced current $i_{CT}$ from the current transformer. While a single current transformer 191 is illustrated, multiple current transformers, such as, for example, current transformers 191, 192, 193, may be coupled together to provide power to the circuit. In particular, the power supply generating circuit 400 may accept the power input from multiple current transformers 191, 192, 193. A single current transformer 191 coupled to a single conductor, such as the conductor 181 in FIG. 1, is shown for illustrative purposes only.

The current transformer 191 can be coupled to the power supply generating circuit 400, such as through connector 410, to name one example. The induced current $i_{CT}$ can flow between the current transformer 191 and the power supply generating circuit 400.

As shown in FIG. 4, the power supply generating circuit 400 can include a full wave rectifier 420. The output of the full wave rectifier 420 can be coupled both to energy storage capacitors 430, 440 and the peak detection circuit 500. The peak detection circuit 500 will be discussed in more depth with respect to FIG. 5.

The charge capacitors 430, 440 can charge to a voltage $V_{chg}$ based on the output of the full wave rectifier 420. By way of example, FIG. 4 shows a charge voltage of 24V being stored across charge capacitors 430, 440.

The power stored in the power supply generating circuit 400 can be utilized in multiple ways by the circuit breaker 100. In some examples of embodiments of the present inventive subject matter, this stored charge can be used to generate other power supply voltages for use in the circuit breaker 100. For example, the 24V stored across charge capacitors 430, 440 could be converted to 5V secondary output voltage 480 for use in other areas of the circuit breaker 100.

The secondary voltage conversion to 5V illustrated in FIG. 4 can be accomplished by a voltage regulation integrated circuit 450. The voltage regulation integrated circuit 450 can be coupled to the charge capacitors 430, 440 such that the charge stored in the charge capacitors 430, 440 can be an input into the voltage regulation integrated circuit 450. An output of the voltage regulation integrated circuit 450 can be used to power other parts of the circuit breaker 100. As an example only, FIG. 4 illustrates a secondary output voltage 480 of 5V being provided as output of the power supply generating circuit 400.

The magnetizing coils of the current transformer 191 may experience saturation from currents within the conductor 181, such as where a short circuit occurs in the wiring protected by the breaker. When saturation occurs, the correspondence between the induced current $i_{CT}$ and the current passing the conductor 181 may change. Because the circuit breaker 100 is designed to detect such high currents as part of its operation, the coils of the current transformer 191 can saturate. In some embodiments, the current transformer 191 may saturate at relatively low current levels. This saturation may not affect the capability of the current transformer 191 to provide power to both the circuit and the charge capacitors 430, 440. Embodiments of the circuit breaker 100 can include additional circuitry to discharge the current transformer 191 and demagnetize the coils of the current transformer 191 in the event the circuit breaker 100 trips.

The secondary output voltage conversion illustrated in FIG. 4 is provided for example purposes only and is not meant to be limiting. Some embodiments of the present inventive subject matter can provide power to the control circuit in ways other than the capacitor and voltage regulator shown.

Figure 5:
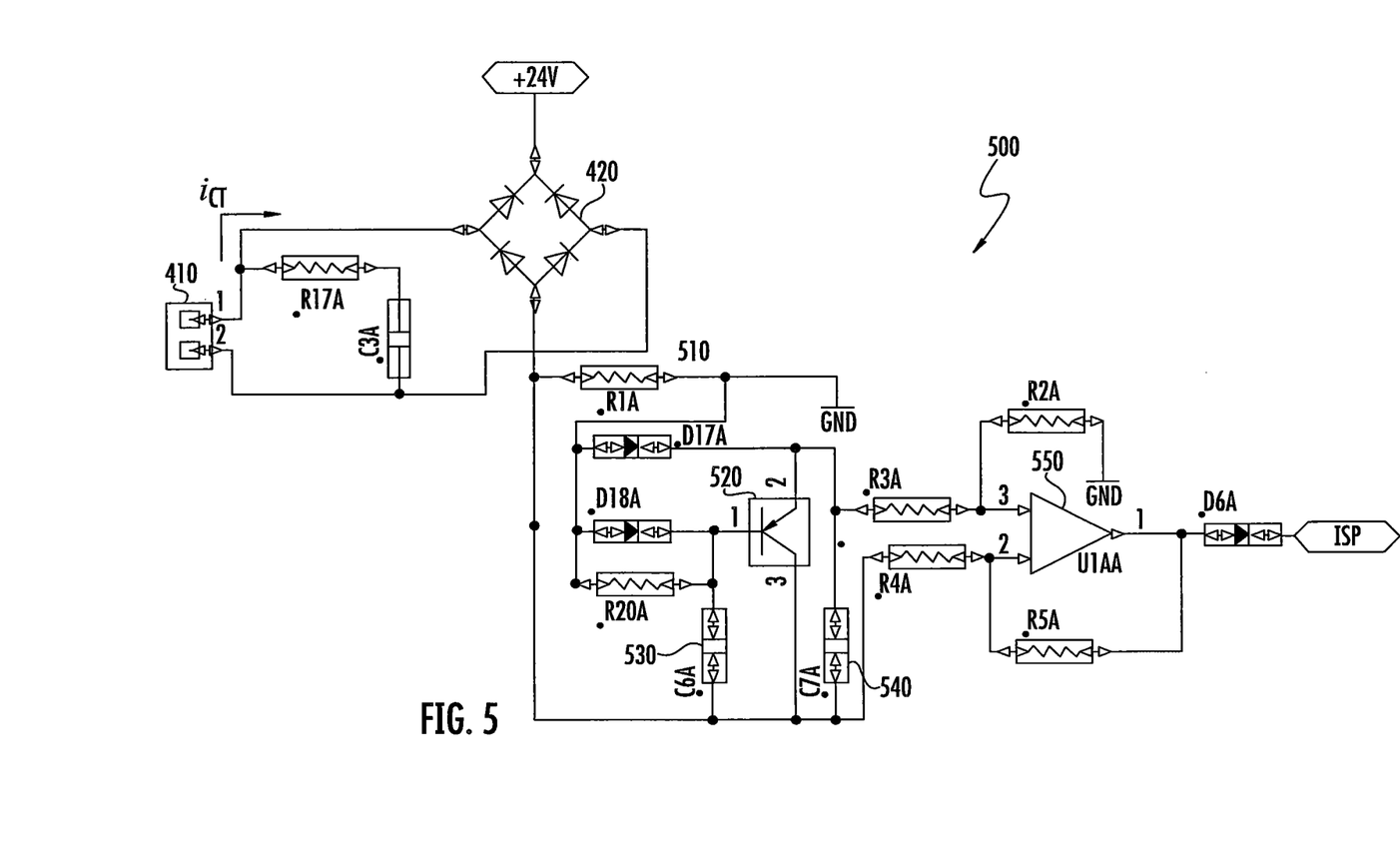
FIG. 5 illustrates an input delay circuit which may be used in some embodiments of the present inventive subject matter.

FIG. 5 illustrates an input delay circuit 500 which may be used in some embodiments of the present inventive subject matter.

For ease of identification, FIG. 5 includes the full wave rectifier 420 and connector 410 discussed with respect to FIG. 4. The output of the full wave rectifier 420 may be coupled to the input delay circuit 500. The output of the full wave rectifier 420 generates a current in current sense resistor 510 contained in the input delay circuit 500.

The current through the current sense resistor 510 may also be coupled to delay transistor 520. The delay transistor 52Q functions in conjunction with delay capacitors 530, 540 to delay a peak level corresponding to the current flowing through sense resistor 510.

The input delay circuit 500 may allow for the peak level of the current flowing through the sense resistor 510 to be delayed for a period of time while the current flowing through the sense resistor 510 continues to transition. The input delay circuit 500 may introduce a delay of one to two milliseconds. The delayed signal can then fed into an input of the signal amplifier 550. The output of the signal amplifier 550 may be output from the input delay circuit (shown as ISP in FIG. 5) to other parts of the circuit breaker 100.

Figure 6:
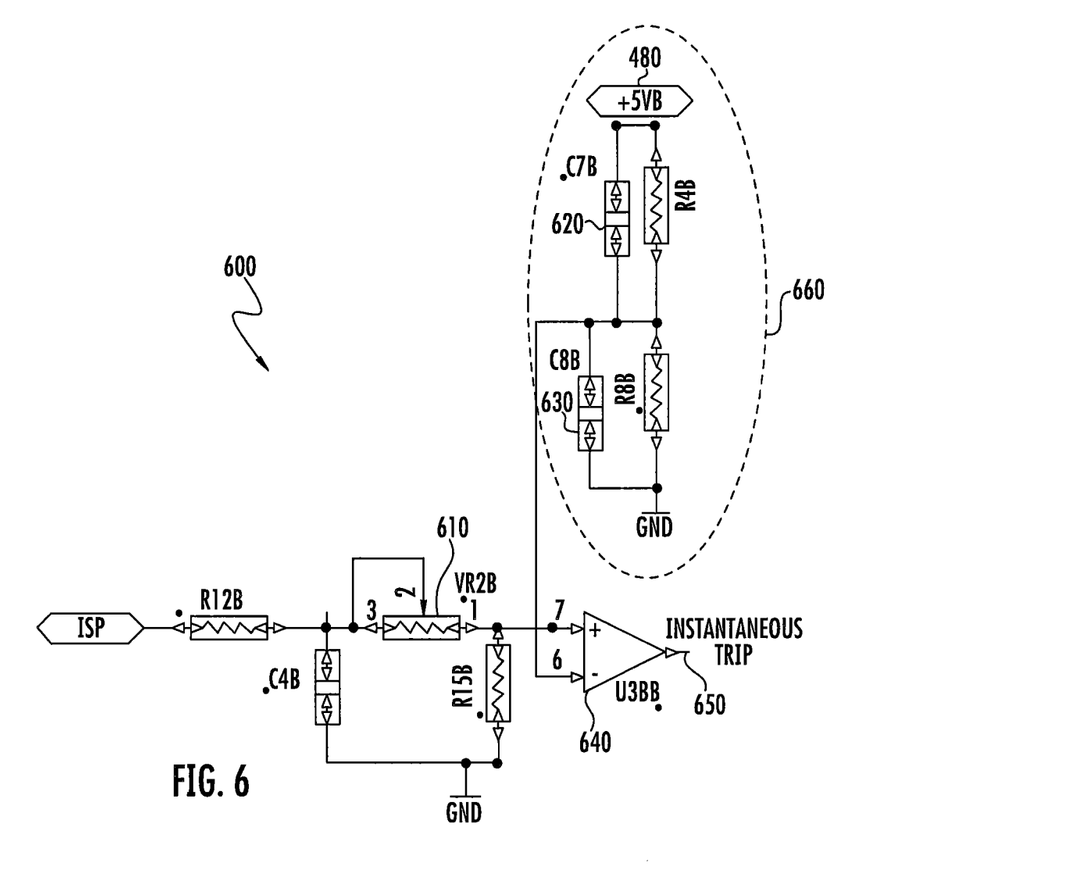
FIG. 6 illustrates an instantaneous trip circuit according to some embodiments of the present inventive subject matter.

FIG. 6 illustrates an instantaneous trip circuit 600 according to some embodiments of the present inventive subject matter. The instantaneous trip circuit 600 may receive as input the output of the input delay circuit 500. This input is illustrated, for example, as ISP in FIG. 6.

The instantaneous trip circuit 600 can generate an instantaneous trip signal 650 via the use of an instantaneous trip comparator 640. The instantaneous trip comparator 640 takes as input an adjusted value of output of the input delay circuit 500 and an output of a reference voltage generating circuit 660.

The output of the input delay circuit 500 may be coupled to a variable instantaneous trip resistor 610. The variable instantaneous trip resistor 610 may allow for adjustment of the output of the input delay circuit 500 being input into the instantaneous trip comparator 640. In other words, by adjusting the resistance value of the variable instantaneous trip resistor 610, the value of a signal being input into the instantaneous trip comparator 640 may be made higher or lower depending on the adjustment. In this way, the current level at which the instantaneous trip function of the circuit breaker 100 will be activated can be adjusted. The variable instantaneous trip resistor 610 may be configured so that it can be adjusted during fabrication and/or by a user of the circuit breaker 100. Further embodiments of the present inventive subject matter may replace the variable instantaneous trip resistor 610 with a resistor that is not adjustable.

As noted, the second input into the instantaneous trip comparator 640 may be the output of the reference voltage generating circuit 660. The reference voltage generating circuit 660 may be composed of a voltage divider comprising reference voltage capacitors 620,630. The reference voltage generating circuit 660 is configured to store a reference voltage on the reference voltage capacitors 620, 630 based on the secondary output voltage 480. As illustrated in FIG. 1 and FIG. 4, the secondary output voltage 480 corresponds to the current provided by the current transformers 191, 192, 193.

In FIG. 6, the input voltage is shown, by way of example, as the 5V secondary output voltage 480. As illustrated in FIG. 4, some embodiments of the present inventive subject matter can generate the 5V secondary output voltage 480 from a voltage of greater magnitude provided by the current transformers 191, 192, 193. Though a 5V signal is illustrated in FIG. 6, the input voltage can be a different level and the present inventive subject matter is not limited thereto.

The reference voltage generating circuit 660 may store a charge on the reference voltage capacitors 620,630 and the voltage stored on the reference voltage capacitors 620,630 may become an input into the instantaneous trip comparator 640. In a steady-state operation, the voltage stored on the reference voltage capacitors 620,630 may be relatively constant, which may allow for a level at which the circuit breaker 100 will trip to remain constant as well.

However, in an initial period of the circuit breaker 100, the circuit breaker 100 may be closed onto a set of conductors 181, 182, 183 which are already shorted. As shown in FIG. 4, the peak value of the induced current $i_{CT}$ from the current transformers 191, 192, 193 may be determined by the primary current through the conductors 181, 182, 183 and the bus voltage (charge capacitors 430, 440). During the initial period, the bus voltage may increase from a start-up level (e.g., zero volts) as power is applied. During steady state operation after the initial period, the bus voltage may be relatively constant. The induced current $i_{CT}$ may be smaller in the initial period than in the steady state operation. A circuit which compared a detected peak value to a static predetermined value could fail to trip the circuit breaker 100 during the initial period when the circuit voltages are lower than the steady state values. In other words, the initial stages of a monitoring circuit experiencing an instantaneous trip may require a lower instantaneous trip value than may be required in the same circuit during steady state operation. Such a lower instantaneous trip value may not be provided by a circuit which uses a static comparison to determine whether the circuit breaker 100 should be tripped.

Embodiments of the present inventive subject matter can address this issue by determining whether the circuit breaker 100 should be tripped based on a comparison of the induced current $i_{CT}$ with the reference voltage generating circuit 660 as illustrated in FIG. 6. In the initial stages of operation for the circuit breaker 100, the voltage divider circuit comprising reference voltage capacitors 620,630 may be charged by the secondary output voltage 480, which may be generated by the power supply generating circuit 400 illustrated in FIG. 4.

During the initial time, the voltage stored in the reference voltage capacitors 620,630 may also decrease and rise, respectively. As a result, the voltage provided as input to the instantaneous trip comparator 640 may also rise. In this way, the level at which the instantaneous trip circuit 600 can trip will start at a lower level and rise to a higher steady state level. This operation can allow the beneficial result that the instantaneous trip circuit 600 can detect early phases of an instantaneous trip condition that could otherwise be missed.

As illustrated in FIG. 6, the output of the instantaneous trip circuit 600 may be an instantaneous trip signal 650. This signal can be provided to other elements of the circuit breaker 100 as described herein.

Figure 7:
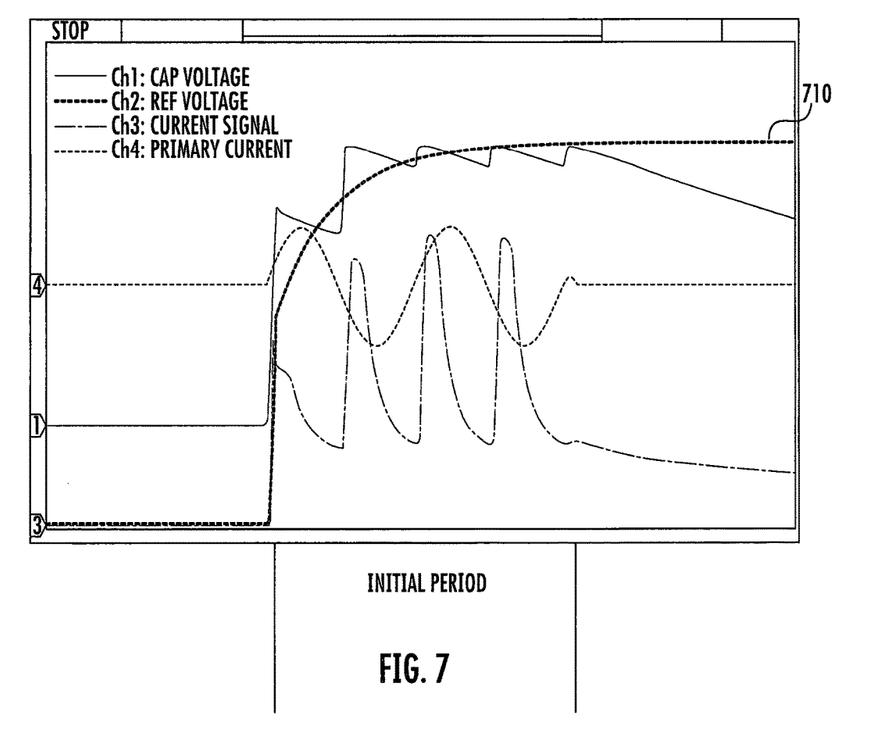
FIG. 7 illustrates a reference voltage transition from an initial period to a steady-state period according to some embodiments of the present inventive subject matter.

FIG. 7 illustrates a reference voltage transition from an initial period to a steady-state period according to some embodiments of the present inventive subject matter.

FIG. 7 illustrates the rising reference voltage 710 during the initial period of the charging of the reference voltage capacitors 630, 63Q, as described herein. The reference voltage 710 will rise from a lower level during an initial period to a higher level during a steady-state period such that the circuit breaker 100 can correctly trip in early stages of operation.

Figure 8:
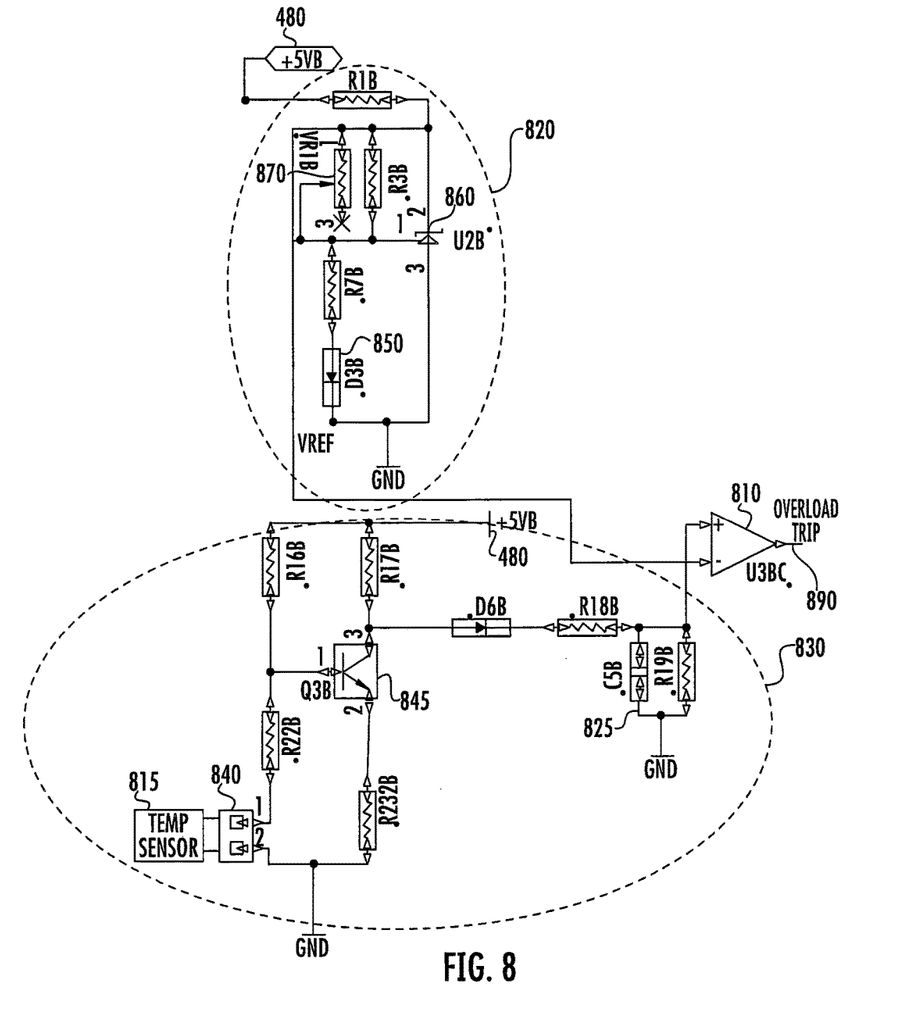
FIG. 8 illustrates an overload trip circuit according to some embodiments of the present inventive subject matter.

FIG. 8 illustrates an overload trip circuit 800 according to some embodiments of the present inventive subject matter.

The overload trip circuit 800 can include an overload trip comparator 810. The overload trip comparator 810 may take as input the output of a temperature measurement circuit 830 and an ambient adjustment circuit 820. The ambient adjustment circuit 820 is a reference circuit with an ambient temperature adjustment function. The overload trip circuit 800 may be powered by the secondary output voltage 480 illustrated in FIG. 4.

The temperature measurement circuit 830 can take as input the signal from a temperature sensor. The temperature sensor 815 can be connected to the temperature measurement circuit 830, for example, at the temperature connectors 840 illustrated in FIG. 8. The temperature sensor can be either internal or external to the circuit breaker 100. That is to say that the signal from the temperature sensor 815 may be provided to the circuit breaker 100 by an external temperature sensor rather than being generated from within the circuit breaker 100.

Though a single temperature sensor 815 is illustrated in FIG. 8, multiple temperature sensors could be used.

The temperature transistor 845 can be configured to latch the output of the temperature sensor 815. When the signal as provided by the temperature sensor 815 exceeds a predetermined limit, the temperature transistor 845 and circuit elements will transition the signal provided to the overload trip comparator 810.

The second input to the overload trip comparator 810 can be the output of an ambient adjustment circuit 820. The ambient adjustment circuit 820 may be configured to provide a signal to the overload trip comparator 810 corresponding to an ambient temperature measurement.

The ambient adjustment circuit 820 may contain an ambient thermal diode 850 which is configured to alter its resistance in response to a change in temperature. Though the ambient thermal diode 850 is illustrated as an example for generating an ambient thermal measurement, those of ordinary skill in the art will recognize that the ambient thermal diode 850 could be replaced by other temperature sensors. In addition, the ambient thermal diode 850 could be either internal or external to the circuit breaker 100. Similarly, the measurement provided by the ambient thermal diode 850 could be provided by more than one thermal diode, or via a combination of ambient thermal sensors.

The ambient thermal diode 850 may be coupled to a controllable voltage source integrated circuit 860 which regulates the output provided to the overload trip comparator 810 based on the voltage of the ambient thermal diode 850 as well as other elements of the ambient adjustment circuit 820.

Some embodiments of the present inventive subject matter may allow the output provided to the overload trip comparator 810 by the ambient adjustment circuit 820 to be altered by adjustment of a variable ambient resistor 870. In other words, by adjusting the resistance value of the ambient resistor 870, the value of a signal being input into the overload trip comparator 810 may be made higher or lower depending on the adjustment. In this way, the level at which the overload function of the circuit breaker 100 will be engaged can be adjusted. The variable ambient resistor 870 may be configured so that it can be adjusted manually by a user of the circuit breaker 100. Alternatively, the variable ambient resistor 870 may not allow for adjustment once it has been initially set to a value. Further embodiments of the present inventive subject matter may replace the variable ambient resistor 870 with a resistor that is not adjustable.

As illustrated in FIG. 8, the output of the overload trip circuit 800 may be an overload trip signal 890. This signal can be provided to other elements of the circuit breaker 100 as described herein.

Figure 9:
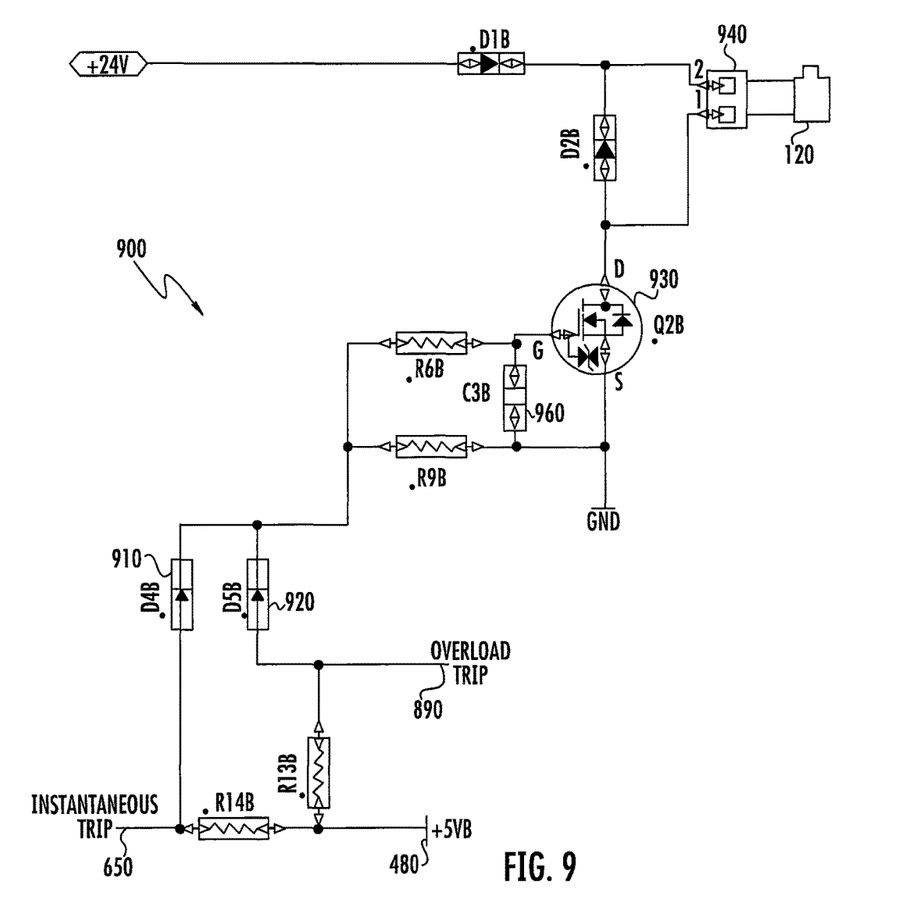
FIG. 9 illustrates a trip generation circuit according to some embodiments of the present inventive subject matter.

FIG. 9 illustrates a trip generation circuit 900 according to some embodiments of the present inventive subject matter.

The trip generation circuit 900 can be coupled to the actuator 120 so as to enable the opening of the contacts 150 as illustrated in FIG. 1. The actuator 120 can be connected to the trip generation circuit 800, for example, via connectors such as the trip connectors 940 illustrated in FIG. 8.

The trip generation circuit 900 can take as inputs the instantaneous trip signal 650 illustrated in FIG. 6 and the overload trip signal 790 illustrated in FIG. 7. The trip generation circuit 900 can energize the actuator 120 when either of the instantaneous trip signal 650 or the overload trip signal 890 is activated.

While only the instantaneous trip signal 650 and the overload trip signal 890 are illustrated in FIG. 9, those of ordinary skill in the art will recognize that additional signals could be provided to activate the trip generation circuit 900 without impacting the present inventive subject matter. Similarly, some embodiments of the present inventive subject matter could also involve the use of only the instantaneous trip signal 650 or only the overload trip signal 890.

As illustrated in FIG. 9, the activation of the actuator 120 can be controlled by a MOSFET 930. The input voltage to the MOSFET 930 can be coupled to signal diodes 910,920 which are coupled to the instantaneous trip signal 650 and the overload trip signal 890, respectively. The signal diodes 910,920 can be configured to perform a logical OR operation such that if either the instantaneous trip signal 650 or the overload trip signal 890 is activated, the secondary output voltage 480 can be provided to the input of the MOSFET 930. A trip capacitor 960 can thus be charged to provide a current through the MOSFET 930 to energize the actuator 120.

The foregoing is illustrative of the present inventive subject matter and is not to be construed as limiting thereof. Although a few embodiments of the present inventive subject matter have been described, those skilled in the art will readily appreciate that many modifications are possible in the embodiments without materially departing from the novel teachings and advantages of the present inventive subject matter. Accordingly, all such modifications are intended to be included within the scope of the present inventive subject matter as defined in the claims. Therefore, it is to be understood that the foregoing is illustrative of the present inventive subject matter and is not to be construed as limited to the specific embodiments disclosed, and that modifications to the disclosed embodiments, as well as other embodiments, are intended to be included within the scope of the appended claims. The present inventive subject matter is defined by the following claims, with equivalents of the claims to be included therein.

What is claimed is:

1. A circuit breaker comprising:
a set of separable contacts moveable between a closed position and an open position;
an operating mechanism configured to open the set of contacts;
a conductor coupled to the set of contacts;
a current transformer coupled to the conductor;
a trip circuit coupled to the operating mechanism and to the current transformer and configured to cause the operating mechanism to open the set of contacts when a current level through the conductor exceeds a current threshold that is greater than a saturation threshold of the current transformer; and
a peak detection circuit configured to detect a peak value of an output current from the current transformer which exceeds a reference peak value,
wherein the reference peak value is configured to rise from an initial reference peak value during an initial period after power is applied to the circuit breaker to a steady-state reference peak value during a steady-state period after the initial period.

2. The circuit breaker of claim 1, further comprising a power supply circuit coupled to the current transformer and configured to supply power to the trip circuit from the current transformer.

3. The circuit breaker of claim 1, wherein the trip circuit is configured to vary a level of the current threshold based on a state of the set of contacts.

4. The circuit breaker of claim 3, wherein the trip circuit is configured to increase the current threshold from an initial current threshold value during an interval following a closure of the set of contacts to a steady-state current threshold value thereafter,
wherein the steady-state current threshold value is greater than the initial current threshold value.

5. The circuit breaker of claim 4, wherein the trip circuit comprises:
a current detection circuit coupled to the current transformer and configured to generate a current detection signal responsive thereto;
a reference signal generator circuit configured to generate a reference signal that varies during the interval following the closure of the set of contacts; and
a trip signal generator circuit configured to generate a trip signal responsive to a comparison of the current detection signal to the reference signal.

6. The circuit breaker of claim 1, further comprising a thermal sensor thermally coupled to the conductor and configured to generate a temperature signal and wherein the trip circuit is further configured to open the set of contacts responsive to the temperature signal.

7. The circuit breaker of claim 6, wherein the thermal sensor comprises a thermal diode and wherein the trip circuit is further configured to open the set of contacts responsive to a voltage across the thermal diode.

8. The circuit breaker of claim 6, wherein the thermal sensor comprises a first thermal sensor that generates a first temperature signal, wherein the circuit breaker further comprises a second thermal sensor configured to generate a second temperature signal indicating an ambient temperature of the circuit breaker, and wherein the trip circuit is further configured to open the set of contacts responsive to the first and second temperature signals.

9. The circuit breaker of claim 8, wherein the trip circuit is configured to open the set of contacts responsive to a comparison of the first temperature signal to a reference temperature signal, and wherein the trip circuit is configured to vary the reference temperature signal responsive to the second temperature signal.

10. The circuit breaker of claim 1, wherein the reference peak value corresponds to the current level through the set of contacts at which the trip circuit is configured to cause the operating mechanism to open the set of contacts.

11. The circuit breaker of claim 1, wherein the rise of the reference peak value from the initial reference peak value to the steady-state reference peak value is responsive to a charging of a capacitor by an output of the current transformer.

12. The circuit breaker of claim 1, wherein the steady-state reference peak value is configured to be dynamically adjustable by altering a variable resistor element within the trip circuit.

13. The circuit breaker of claim 1, wherein the peak detection circuit is configured to detect the peak value of the output current from the current transformer by comparing a first signal corresponding to the output current from the current transformer to a reference voltage corresponding to the reference peak value.

14. The circuit breaker of claim 13, further comprising a reference voltage generating circuit configured to generate the reference voltage,
wherein the reference voltage generating circuit comprises at least one reference voltage capacitor configured to store the reference voltage based on a secondary output voltage that corresponds to the output current from the current transformer.

15. The circuit breaker of claim 13, wherein a level of the reference voltage is generated based on the output current from the current transformer.

16. The circuit breaker of claim 13, further comprising an input delay circuit configured to delay comparing the first signal corresponding to the output current from the current transformer to the reference voltage corresponding to the reference peak value.

17. The circuit breaker of claim 16, wherein the input delay circuit delays comparing the first signal corresponding to the output current from the current transformer to the reference voltage corresponding to the reference peak value for 1 to 2 milliseconds.

18. The circuit breaker of claim 1, wherein the trip circuit is configured to cause the operating mechanism to open the set of contacts responsive to the peak detection circuit detecting that the peak value of the output current from the current transformer exceeds the reference peak value.

19. The circuit breaker of claim 18, wherein the trip circuit is configured to cause the operating mechanism to open the set of contacts responsive to a first peak value of the output current from the current transformer during the initial period after power is applied to the circuit breaker,
wherein the trip circuit is configured to cause the operating mechanism to open the set of contacts responsive to a second peak value of the output current from the current transformer during the steady-state period after the initial period, and
wherein the second peak value is greater than the first peak value.

20. A circuit breaker comprising:
a set of separable contacts moveable between a closed position and an open position;
an operating mechanism configured to open the set of contacts;

a conductor coupled to the set of contacts;
a current transformer coupled to the conductor; and
a trip circuit coupled to the operating mechanism and to the current transformer and configured to cause the operating mechanism to open the set of contacts when a current level through the conductor exceeds a current threshold that is greater than a saturation threshold of the current transformer,
wherein the trip circuit is configured to vary the current threshold during an interval following a closure of the set of contacts and to provide a fixed current threshold thereafter,
wherein the trip circuit comprises:
    a current detection circuit coupled to the current transformer and configured to generate a current detection signal responsive thereto;
    a reference signal generator circuit configured to generate a reference signal that varies during the interval following the closure of the set of contacts; and
    a trip signal generator circuit configured to generate a trip signal responsive to a comparison of the current detection signal to the reference signal,
    wherein the reference signal generator circuit comprises:
        a voltage regulator with an input voltage coupled to an output of the current transformer, and an output voltage coupled to a first node;
        a first resistor and a first capacitor connected in parallel, and coupled to the first node and to a second node; and
        a second resistor and a second capacitor connected in parallel, and coupled to the second node and to ground.

21. The circuit breaker of claim 20, wherein the trip signal generator circuit comprises:
a first variable resistor coupled to the current detection signal; and
an instantaneous trip comparator with a first input coupled to the second node and a second input coupled to the first variable resistor, wherein the trip signal is an output of the instantaneous trip comparator.

22. A circuit breaker comprising:
a set of separable contacts moveable between a closed position and an open position;
an operating mechanism configured to open the set of contacts;
a conductor coupled to the set of contacts;
a first thermal sensor thermally coupled to the conductor and configured to generate a first temperature signal indicating a temperature of the conductor;
a second thermal sensor configured to generate a second temperature signal indicating an ambient temperature of the circuit breaker;
a trip circuit coupled to the operating mechanism and to the first and second thermal sensors and configured to cause the operating mechanism to open the set of contacts responsive to the first and second temperature signals;
a current transformer coupled to the conductor;
a second trip circuit coupled to the current transformer and the operating mechanism and configured to cause the operating mechanism to open the set of contacts responsive to a current level through the set of contacts that is greater than a saturation level of the current transformer; and
an ambient temperature circuit comprising:
    a controllable voltage source integrated circuit with a first input coupled to a reference voltage, a second input coupled to ground and a first output coupled to an output node of the ambient temperature circuit;
    a variable resistor coupled to the reference voltage and to the output node of the ambient temperature circuit; and
    an ambient thermal diode coupled to the output node of the ambient temperature circuit and to ground;
    a transistor with a drain coupled to the reference voltage, a source coupled to ground and a gate coupled to a voltage across a thermal diode; and
    a trip comparator with a first input coupled to the output node of the ambient temperature circuit, a second input coupled to the drain of the transistor, and an output of the trip comparator configured to cause the operating mechanism to open the set of contacts,
wherein the trip circuit is configured to open the set of contacts responsive to a comparison of the first temperature signal to a reference temperature signal, and
wherein the trip circuit is configured to vary the reference temperature signal responsive to the second temperature signal, and
wherein the reference temperature signal is configured to be dynamically adjusted by altering a variable resistor element within the trip circuit.

* * * * *

UNITED STATES PATENT AND TRADEMARK OFFICE
CERTIFICATE OF CORRECTION

| | | |
|---|---|---|
| PATENT NO. | : 9,842,709 B2 | Page 1 of 1 |
| APPLICATION NO. | : 14/663890 | |
| DATED | : December 12, 2017 | |
| INVENTOR(S) | : Zheng et al. | |

It is certified that error appears in the above-identified patent and that said Letters Patent is hereby corrected as shown below:

In the Specification

Column 9, Line 23: Please correct "52Q" to read -- 520 --

Column 11, Line 6: Please correct "63Q" to read -- 630 --

Signed and Sealed this
Third Day of July, 2018

Andrei Iancu
*Director of the United States Patent and Trademark Office*